United States Patent
Glugla et al.

(10) Patent No.: US 6,681,563 B2
(45) Date of Patent: Jan. 27, 2004

(54) EXHAUST GAS OXYGEN SENSOR TEMPERATURE CONTROL FOR A VARIABLE DISPLACEMENT ENGINE

(75) Inventors: Christopher P. Glugla, Macomb, MI (US); John Ottavio Michelini, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/683,932

(22) Filed: Mar. 5, 2002

(65) Prior Publication Data

US 2002/0116917 A1 Aug. 29, 2002

Related U.S. Application Data

(63) Continuation of application No. 09/732,330, filed on Dec. 7, 2000, now Pat. No. 6,381,953.

(51) Int. Cl.[7] .................................................. F01N 3/00
(52) U.S. Cl. ............................. 60/285; 60/274; 60/276; 60/284; 123/198 F; 123/697
(58) Field of Search .......................... 60/274, 276, 277, 60/284, 285; 123/691, 692, 697, 198 F, 481

(56) References Cited

U.S. PATENT DOCUMENTS

| | | | |
|---|---|---|---|
| 4,107,921 A | * | 8/1978 | Iizuka .................... 123/198 F |
| 4,134,261 A | | 1/1979 | Iizuka et al. |
| 4,165,610 A | | 8/1979 | Iizuka et al. |
| 4,274,373 A | * | 6/1981 | Sugasawa et al. ....... 123/198 F |
| 4,467,602 A | | 8/1984 | Iizuka et al. |
| 4,911,130 A | | 3/1990 | Takahashi et al. |
| 4,993,392 A | | 2/1991 | Tanaka et al. |
| 5,167,120 A | | 12/1992 | Junginger et al. |
| 5,218,946 A | * | 6/1993 | Wild et al. .................. 123/697 |
| 5,437,253 A | | 8/1995 | Huffmaster et al. |
| 5,460,129 A | | 10/1995 | Miller et al. |
| 5,490,486 A | | 2/1996 | Diggs |
| 5,497,745 A | | 3/1996 | Cullen et al. |
| 5,540,202 A | | 7/1996 | Cullen et al. |
| 5,600,947 A | | 2/1997 | Cullen |
| 5,653,102 A | | 8/1997 | Orzel et al. |
| 5,711,387 A | | 1/1998 | Murata et al. |
| 5,722,236 A | | 3/1998 | Cullen et al. |
| 5,836,292 A | | 11/1998 | Aoki |
| 5,956,941 A | | 9/1999 | Cullen et al. |
| 5,969,230 A | | 10/1999 | Sakai et al. |
| 5,970,943 A | | 10/1999 | Robichaux et al. |
| 6,023,929 A | | 2/2000 | Ma |
| 6,164,065 A | | 12/2000 | Denari et al. |
| 6,205,776 B1 | * | 3/2001 | Otsuka ........................ 60/285 |
| 6,237,330 B1 | | 5/2001 | Takahashi et al. |
| 6,332,459 B1 | * | 12/2001 | Ehara et al. ................. 123/697 |
| 6,381,953 B1 | * | 5/2002 | Glugla et al. .................. 60/285 |
| 6,422,000 B1 | * | 7/2002 | Poggio et al. ............... 123/697 |

FOREIGN PATENT DOCUMENTS

| | | | |
|---|---|---|---|
| JP | 59-79052 | * | 5/1984 |
| JP | 1-232143 | * | 9/1989 |

* cited by examiner

*Primary Examiner*—Thomas Denion
*Assistant Examiner*—Tu M. Nguyen
(74) *Attorney, Agent, or Firm*—Allan J. Lippa; Kolisch Hartwell, PC

(57) ABSTRACT

A system and method for controlling temperature of an exhaust gas oxygen sensor in a system having a variable displacement engine include monitoring temperature of the sensor, comparing the sensor temperature to a corresponding desired temperature, and controlling the system to maintain the sensor temperature at or above the desired operating temperature. In one embodiment, the sensor is a heated exhaust gas oxygen (HEGO) sensor and the method includes controlling an integrated sensor heater to maintain the sensor temperature above the desired operating temperature. Depending upon the particular application, the system may also be controlled by controlling the engine to reactivate at least one deactivated cylinder to increase the temperature of the sensor alone or in combination with controlling an integrated or auxiliary sensor heater for systems using HEGO sensor(s).

19 Claims, 3 Drawing Sheets

EXHAUST GAS OXYGEN SENSOR TEMPERATURE CONTROL FOR A VARIABLE DISPLACEMENT ENGINE

CROSS REFERENCE TO RELATED APPLICATIONS

This application is a continuation of commonly owned U.S. patent application Ser. No. 09/732,330, filed Dec. 7, 2000, now U.S. Pat. No. 6,381,953, the disclosure of which is incorporated by reference in its entirety.

BACKGROUND OF INVENTION

1. Field of the Invention

The present invention relates to a system and method for controlling temperature for an exhaust gas oxygen sensor used with a variable displacement engine.

2. Background Art

Fuel economy for a multi-cylinder internal combustion engine can be improved by deactivating some of the engine cylinders under certain operating conditions. Reducing the number of operating cylinders reduces the effective displacement of the engine such that it is sometimes referred to as a variable displacement engine. Depending upon the particular configuration of the variable displacement engine, one or more cylinders may be selectively deactivated to improve fuel economy under light load conditions, for example. In some engine configurations, a group of cylinders, which may be an entire bank of cylinders, is selectively deactivated.

Reducing the number of operating cylinders may also reduce the operating temperature of various engine and/or vehicle components which may adversely affect desired engine operation. For example, exhaust gas oxygen sensors used in conjunction with emission control devices, such as catalytic converters, require a minimum operating temperature to provide a reliable signal which may be used for more efficient closed-loop control of the air/fuel ratio. For variable displacement engines configured to selectively operate an entire bank of cylinders, sensors associated with the deactivated bank may cool below the desired operating temperature.

SUMMARY OF INVENTION

An object of the present invention is to provide a system and method for controlling temperature of an exhaust gas oxygen sensor used with a variable displacement internal combustion engine to maintain a desired operating temperature, particularly for bank-configured engines.

In carrying out the above object and other objects, advantages, and features of the invention, a system and method for controlling temperature of an exhaust gas oxygen sensor in a system having a variable displacement engine include monitoring temperature of the sensor, comparing the sensor temperature to a corresponding desired temperature, and controlling the system to maintain the sensor temperature at or above the desired operating temperature. In one embodiment, the sensor is a heated exhaust gas oxygen (HEGO) sensor and the method includes controlling an integrated sensor heater to maintain the sensor temperature above the desired operating temperature. Depending upon the particular application, the system may also be controlled by controlling the engine to reactivate at least one deactivated cylinder to increase the temperature of the sensor alone or in combination with controlling an integrated or auxiliary sensor heater for systems using HEGO sensor(s).

The present invention provides a number of advantages. For example, the present invention controls the engine and/or the sensor heater to maintain a minimum desired operating temperature to facilitate closed-loop control of the air/fuel ratio which generally reduces feedgas emissions and provides more efficient operation of the engine and/or associated emission control devices.

The above advantage and other advantages, objects, and features of the present invention will be readily apparent from the following detailed description of the preferred embodiments when taken in connection with the accompanying drawings.

DETAILED DESCRIPTION

Figure 1:
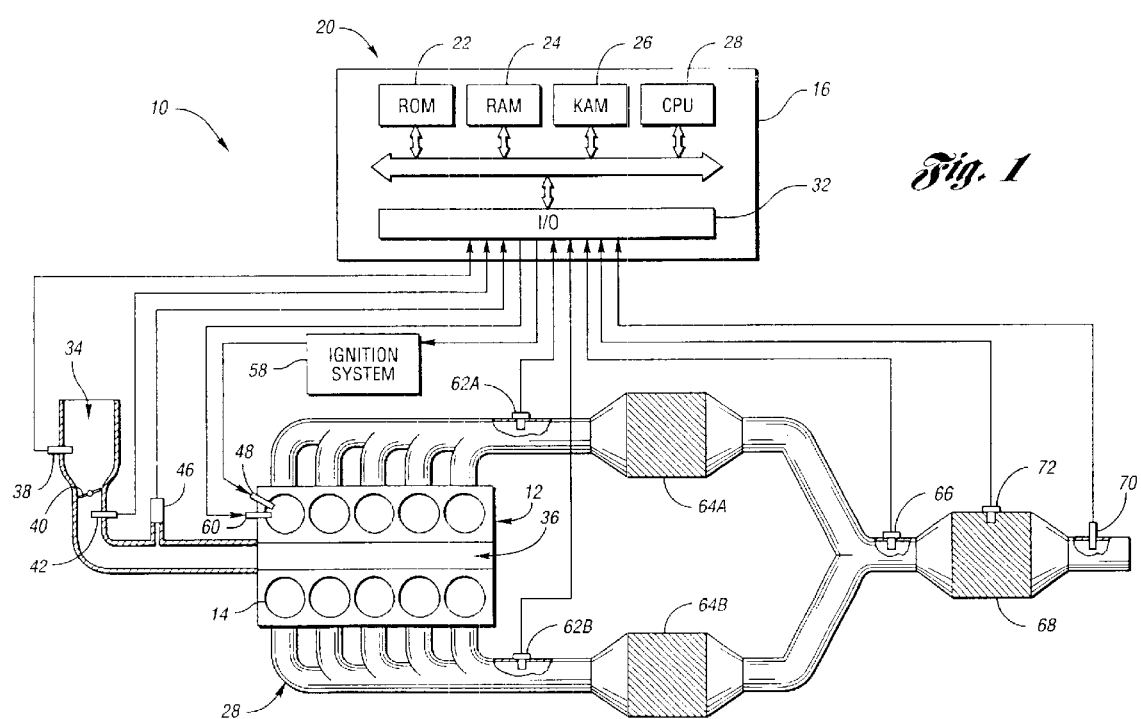
FIG. 1 is a block diagram illustrating operation of one embodiment for a system or method for controlling temperature of an exhaust gas oxygen sensor according to the present invention.

A block diagram illustrating an engine control system for a representative internal combustion engine operable in a variable displacement mode to maintain a minimum temperature of an exhaust gas oxygen sensor according to the present invention is shown in FIG. 1. System 10 preferably includes an internal combustion engine 12 having a plurality of cylinders, represented by cylinder 14. In one preferred embodiment, engine 12 includes ten cylinders arranged in a "V" configuration having two cylinder banks with five cylinders each. As used herein, a cylinder bank refers to a related group of cylinders having one or more common characteristics, such as being located proximate one another or having a common emission control device (ECD) or exhaust manifold for example. This would include configurations having a group of cylinders on the same side of the engine treated as a bank even though these cylinders may not share a common exhaust manifold, i.e., the exhaust manifold could be configured with separate exhaust runners or branches if desired or beneficial. Likewise, cylinder banks can also be defined for in-line cylinder configurations which are within the scope of the present invention.

As one of ordinary skill in the art will appreciate, system 10 includes various sensors and actuators to effect control of the engine. One or more sensors or actuators may be provided for each cylinder 14, or a single sensor or actuator may be provided for the engine. For example, each cylinder 14 may include four actuators which operate corresponding intake and exhaust valves, while only including a single engine coolant temperature sensor for the entire engine. However, the block diagrams of the Figures generally illustrate only a single type of sensor for ease of illustration and description.

System 10 preferably includes a controller 16 having a microprocessor 28 in communication with various computer-readable storage media, indicated generally by reference numeral 20. The computer readable storage media preferably include a read-only memory (ROM) 22, a random-access memory (RAM) 24, and a keep-alive memory (KAM) 26. As known by those of ordinary skill in the art, KAM 26 is used to store various operating variables while controller 16 is powered down but is connected to the vehicle battery. Computer-readable storage media 20 may be implemented using any of a number of known memory devices such as PROMs, EPROMs, EEPROMs, flash memory, or any other electric, magnetic, optical, or combination memory device capable of storing data, some of which represent executable instructions, used by microprocessor 28 in controlling the engine. Microprocessor 28 communicates with the various sensors and actuators via an input/output (I/O) interface 32. Of course, the present invention could utilize more than one physical controller, such as controller 16, to provide engine/vehicle control depending upon the particular application In operation, air passes through intake 34 where it may be distributed to the plurality of cylinders via an intake manifold, indicated generally by reference numeral 36. System 10 preferably includes a mass airflow sensor 38 which provides a corresponding signal (MAF) to controller 16 indicative of the mass airflow. If no mass airflow sensor is present, a mass airflow value may be inferred from various engine operating parameters. A throttle valve 40 may be used to modulate the airflow through intake 34 during certain operating modes. Alternatively, the present invention may be used in throttle-less applications which may use electronically controlled valves and variable valve timing to modulate intake airflow. Throttle valve 40 is preferably electronically controlled by an appropriate actuator 42 based on a corresponding throttle position signal generated by controller 16. A throttle position sensor provides a feedback signal (TP) indicative of the actual position of throttle valve 40 to controller 16 to implement closed-loop control of throttle valve 40.

As illustrated in FIG. 1, a manifold absolute pressure sensor 46 may be used to provide a signal (MAP) indicative of the manifold pressure to controller 16. Air passing through intake 34 enters the combustion chambers or cylinders 14 through appropriate control of one or more intake valves. The intake and exhaust valves may be controlled directly or indirectly by controller 16 along with ignition timing (spark) and fuel to selectively activate/deactivate one or more cylinders 12 to provide variable displacement operation. Variable displacement operation may be selectively used to maintain a minimum operating temperature for one or more exhaust gas oxygen sensors according to the present invention as explained in greater detail below.

A fuel injector 48 injects an appropriate quantity of fuel in one or more injection events for the current operating mode based on a signal (FPW) generated by controller 16 processed by an appropriate driver. Control of the fuel injection events is generally based on the position of the pistons within respective cylinders 14. Position information is acquired by an appropriate crankshaft sensor which provides a position signal (PIP) indicative of crankshaft rotational position. At the appropriate time during the combustion cycle, controller 16 generates a spark signal (SA) which is processed by ignition system 58 to control spark plug 60 and initiate combustion within an associated cylinder 14.

Controller 16 (or a camshaft arrangement) controls one or more exhaust valves to exhaust the combusted air/fuel mixture of activated or running cylinders through an associated exhaust manifold, indicated generally by reference numeral 28. Depending upon the particular engine configuration, one or more exhaust manifolds may be used. In one preferred embodiment, engine 12 includes an exhaust manifold 28 associated with each bank of cylinders as illustrated in FIG. 1.

An exhaust gas oxygen sensor 62 is preferably associated with each bank of cylinders and provides a signal (EGO) indicative of the oxygen content of the exhaust gases to controller 16. As known by those of ordinary skill in the art, the EGO signal may be used as feedback in a closed-loop controller to control the air/fuel ratio provided to the one or more cylinders. Closed-loop operation is generally more efficient than open-loop operation under similar operating conditions. However, a reliable EGO signal for use in closed-loop operation generally requires the EGO sensor to be above a minimum operating temperature. As such, the present invention provides a system and method for reducing or eliminating open-loop operation time by appropriate engine/sensor control to quickly achieve and maintain a desired minimum operating temperature of the exhaust gas oxygen sensor(s).

The present invention is independent of the particular type of exhaust gas oxygen sensor utilized, which may depend on the particular application. In one embodiment, heated exhaust gas oxygen sensors (HEGO) are used. Of course, various other air/fuel ratio indicators or sensors may be used such as a universal exhaust gas oxygen sensor (UEGO), for example. The exhaust gas oxygen sensor signals may be used to independently adjust the air/fuel ratio, or control the operating mode of one or more cylinders or banks of cylinders. The exhaust gas passes through the exhaust manifolds 28 to associated upstream emission control devices (ECDS) 64A and 64B which may be catalytic converters, for example. After passing through the associated upstream ECDs, the exhaust gas is combined and flows past an underbody exhaust gas oxygen sensor 66 and through a downstream or underbody emission control device 68 before flowing past a catalyst monitoring sensor 70 (typically another exhaust gas oxygen sensor) and being exhausted to atmosphere.

A temperature sensor 72 may be provided to monitor the temperature of a catalyst within emission control device 68, depending upon the particular application. Alternatively, the temperature may be estimated using an appropriate temperature model based on various other sensed or estimated engine/vehicle parameters which may include mass airflow, manifold absolute pressure or load, engine speed, air temperature, engine coolant temperature, and/or engine oil temperature, for example. Likewise, temperature of exhaust gas oxygen sensors 62A, 62B and/or 66 can be measured or estimated using an appropriate model. A representative temperature model is described in U.S. Pat. No. 5,956,941, for example.

According to the present invention, controller 16 controls selective activation/deactivation of one or more cylinders alone or in combination with an auxiliary or integrated heater for an exhaust gas oxygen sensor to quickly achieve and maintain a minimum desired operating temperature and facilitate closed-loop operation. In a preferred embodiment, engine 12 is a V-10 engine with variable displacement operation provided by selectively deactivating one bank of cylinders under appropriate engine and/or vehicle operating conditions, such as light load, for example. While operating in the variable displacement mode, the temperature of the exhaust gas oxygen sensor associated with the deactivated cylinder or bank of cylinders will decrease. According to the present invention, the associated sensor heater is controlled to achieve or maintain a desired minimum operating temperature for the sensor to facilitate closed-loop operation using the sensor signal. If activation of the heater is insufficient to achieve or maintain the desired temperature, the deactivated cylinder bank may then be selectively activated to maintain a minimum operating temperature of one or more exhaust gas oxygen sensors. For example, the second cylinder bank may be reactivated to maintain the temperature of sensor 62B at or above an associated minimum operating temperature. In one preferred embodiment, sensors 62A and 62B are HEGO sensors which have integrated sensor heaters selectively controlled by controller 16 to maintain a minimum desired operating temperature. Sensor heater control is preferably coordinated with selective activation/deactivation of one or more cylinders according to one embodiment of the present invention.

Figure 2:
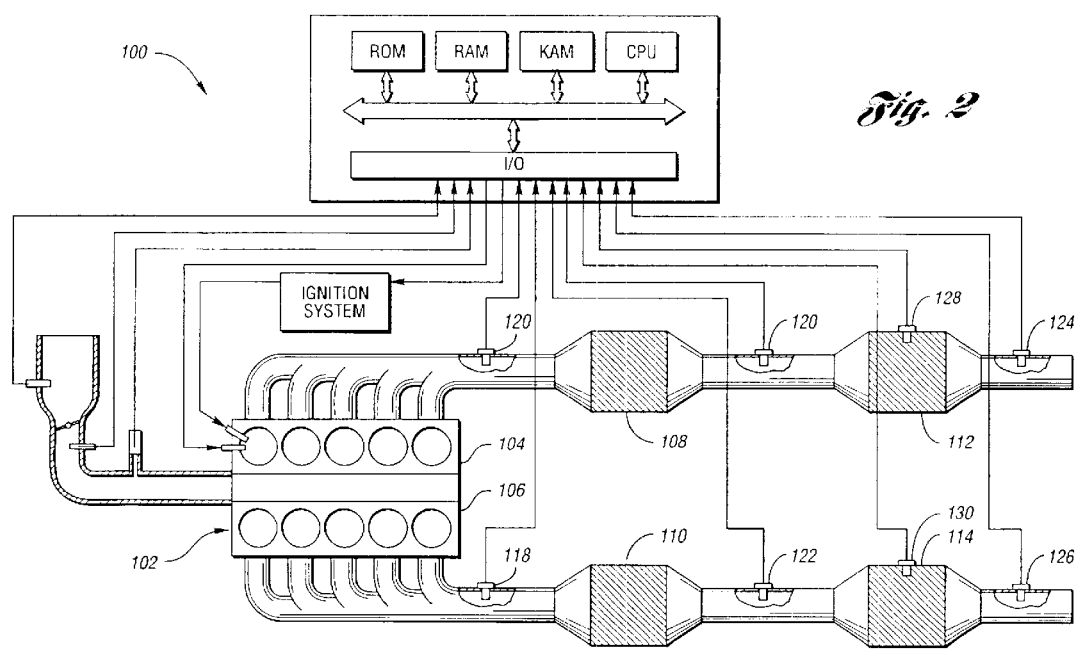
FIG. 2 is a block diagram illustrating operation of another embodiment for a system or method for controlling temperature of an exhaust gas oxygen sensor according to the present invention.

Referring now to FIG. 2, an alternative embodiment for controlling temperature of an exhaust gas oxygen sensor used in a variable displacement engine is shown. As will be recognized by those of ordinary skill in the art, system 100 includes similar components as described with reference to the embodiment illustrated in FIG. 1 and incorporated here by reference. Internal combustion engine 102 includes two cylinder banks 104, 106. Each cylinder bank includes an associated upstream or close-coupled emission control device 108 and 110, respectively. In addition, rather than combining the exhaust and using a common third emission control device as illustrated in FIG. 1, each bank 104, 106 also has an associated downstream or underbody emission control device 112, 114, respectively. In one embodiment, the emission control devices 108, 110, 112, and 114 are three-way catalysts.

As also illustrated in FIG. 2, each ECD has an associated exhaust gas oxygen sensor 116, 118, 120, 122, respectively, which are preferably HEGO sensors. Additional exhaust gas oxygen sensors 124, 126 may be provided downstream relative to downstream ECDs 112, 114, respectively, to provide a conversion efficiency indication and monitor operation of the emission control devices. Downstream ECDs 112, 114 preferably include associated temperature sensors 128, 130 to provide an indication of the catalyst temperature which may be used to determine or estimate the temperature of associated exhaust gas oxygen sensors. It should be recognized by those of ordinary skill in the art that the temperature of the emission control devices and/or the temperature of one or more exhaust gas oxygen sensors can be modeled as described above with reference to the embodiment illustrated in FIG. 1. Sensor temperature modeling may be used alone or in combination with one or more temperature sensors to maintain operating temperature above a desired minimum operating temperature according to the present invention.

Alternatively, the sensor signal may be used alone or in combination with various other operating parameters or variables to provide an indication of the sensor temperature. For example, the sensor signal may exhibit predetermined characteristics as the sensor temperature approaches its minimum desired operating temperature. Such characteristics may be used to activate the sensor heater or one or more deactivated cylinders to increase the sensor temperature. Of course, one of ordinary skill in the art will recognize that a variety of engine/vehicle operating parameters influence the current operating mode and selective activation/deactivation of one or more cylinders to provide variable displacement operation. These parameters may affect or override the decision to activate/deactivate cylinders to provide the temperature control features in accordance with the present invention.

Figure 3:
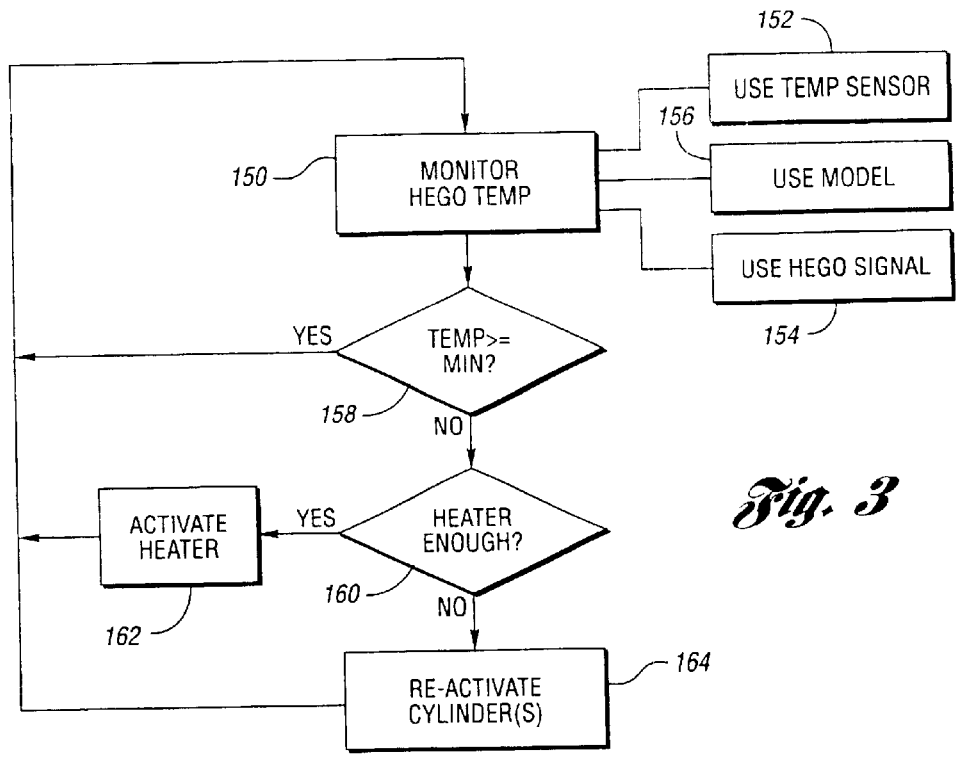
FIG. 3 is a flow diagram illustrating operation of one embodiment for a system or method for controlling temperature of a heated exhaust gas oxygen sensor used with a variable displacement engine according to the present invention.
Figure 4:
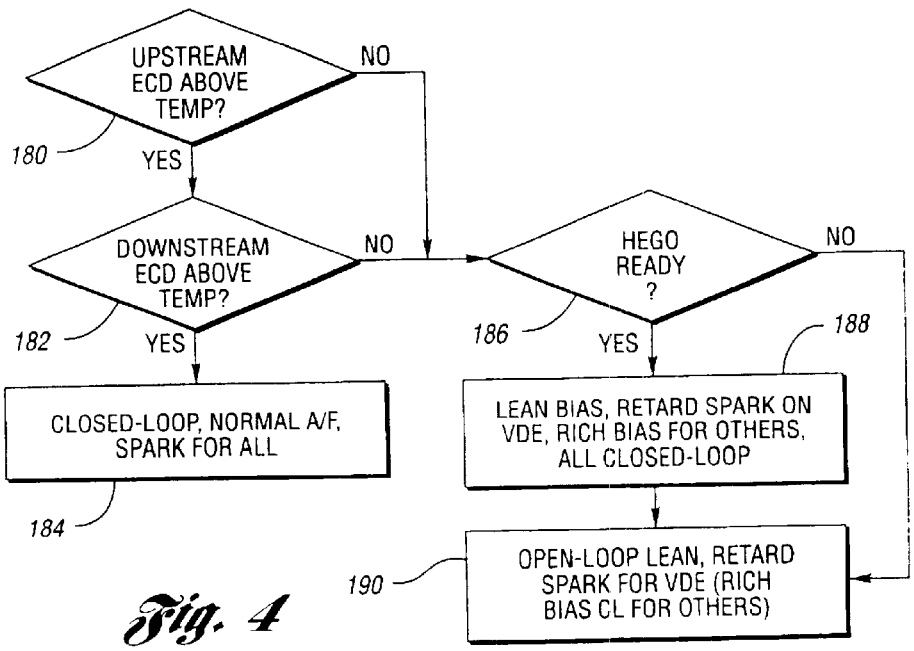
FIG. 4 is a logic diagram illustrating a reactivation strategy for cylinders of a variable displacement engine to maintain a minimum operating temperature of an exhaust gas oxygen sensor according to one embodiment of the present invention.

The diagrams of FIGS. 3 and 4 generally represent control logic for one embodiment of a system or method according to the present invention. As will be appreciated by one of ordinary skill in the art, the diagrams may represent any one or more of a number of known processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages of the invention, but is provided for ease of illustration and description. Although not explicitly illustrated, one of ordinary skill in the art will recognize that one or more of the illustrated steps or functions may be repeatedly performed depending upon the particular processing strategy being used.

Preferably, the control logic is implemented primarily in software executed by a microprocessor-based engine controller. Of course, the control logic may be implemented in software, hardware, or a combination of software and hardware depending upon the particular application. When implemented in software, the control logic is preferably provided in a computer-readable storage medium having stored data representing instructions executed by a computer to control the engine. The computer-readable storage medium or media may be any of a number of known physical devices which utilize electric, magnetic, and/or optical devices to temporarily or persistently store executable instructions and associated calibration information, operating variables, and the like.

A flow diagram illustrating operation of one embodiment for a system or method for controlling temperature of a heated exhaust gas oxygen sensor used with a variable displacement engine according to the present invention is shown in FIG. 3. Block 150 of FIG. 3 represents determining or monitoring the temperature of the exhaust gas oxygen sensor(s). In one embodiment, at least one exhaust gas oxygen sensor is a HEGO sensor. The sensor temperature may be determined directly using an associated temperature sensor as represented by block 152. Alternatively, or in addition, the sensor temperature may be determined using an appropriate model as represented by block 154 or using characteristics of the sensor signal itself as represented by block 156. However, use of the sensor signal characteristics to determine whether the HEGO sensor is ready to switch is generally only valid if operating in a narrow window and modulating fuel about the stoichiometric point.

Block 158 determines whether the exhaust gas oxygen temperature sensor is above a corresponding minimum desired operating temperature. Alternatively, this test is effectively a determination of whether the sensor signal provided by the exhaust gas oxygen sensor is reliable enough for closed-loop air/fuel ratio control. If the sensor has reached a minimum operating temperature, or the signal is determined to be reliable enough for closed-loop control, the process continues with block 150 monitoring the sensor temperature for changes. If the sensor temperature is below a minimum desired operating temperature, block 160 determines whether an associated sensor heater may be used to achieve or maintain the desired minimum operating temperature. Block 162 represents activation of the heater associated with the sensor being controlled. The amount of current provided to the associated heater may be used to control the operating temperature. Block 150 then continues to monitor the temperature sensor.

If the associated heater activation is insufficient to achieve or maintain the desired minimum operating temperature as determined by blocks 158 and 160, one or more cylinders may be reactivated as represented by block 164. One possible reactivation strategy is illustrated and described with reference to FIG. 4.

FIG. 4 provides a block diagram illustrating a cylinder activation/deactivation strategy according to one embodiment of the present invention. Block 180 of FIG. 4 represents monitoring of at least one engine or vehicle component such as an emission control device (ECD). In this embodiment, block 180 determines whether an upstream ECD is above a corresponding or associated temperature threshold. For example, the temperature threshold may correspond to the light-off temperature of a three-way catalyst. Block 182 determines whether a downstream ECD is above a corresponding temperature. The downstream ECD may be associated with a single upstream device, as illustrated in FIG. 2, or shared by multiple upstream devices as illustrated in FIG. 1. If the upstream ECD is above the corresponding temperature threshold as determined by block 180 and the downstream ECD is above its associated temperature threshold as determined by block 182, all cylinders are operated under closed-loop control with a normal scheduled air/fuel ratio and spark or ignition timing as represented by block 184.

If the upstream component is below its associated temperature threshold as indicated by block 180, or the downstream component is below its associated temperature threshold as indicated by block 182, block 186 determines whether an associated exhaust gas oxygen sensor is available for providing information sufficient to operate closed-loop. In this particular embodiment, block 186 determines whether an associated HEGO sensor has reached an appropriate operating temperature to provide reliable information with respect to the oxygen content of the exhaust gas. If the associated HEGO sensor is ready for closed-loop operation as determined by block 186, the previously deactivated cylinders are activated with a lean bias on the air/fuel ratio and spark retarded from MBT. The previously running or activated cylinders may be operated with a rich bias air/fuel ratio depending upon the exhaust configuration. Preferably, for exhaust configurations as illustrated in FIG. 1, the number of cylinders operating with a rich bias corresponds to the number of cylinders operating with a lean bias such that the combined feedgas emissions approach the stoichiometric ratio prior to entering the downstream or underbody catalyst. All cylinders are operated using closed-loop control of air/fuel ratio based on the HEGO sensor reading with appropriate lean/rich bias as represented by block 188. In one embodiment, an entire bank of cylinders is activated and operated with a lean bias and retarded spark until the downstream ECD reaches its temperature threshold as determined by block 182.

If the HEGO sensor associated with the ECD is not ready for closed-loop operation as determined by block 186, the engine is controlled to activate the deactivated cylinders and operate them open-loop with a lean air/fuel ratio and spark retarded from MBT. The previously activated or running cylinders are operated with a rich bias air/fuel ratio in closed-loop mode for exhaust configurations as illustrated in FIG. 1.

As such, the present invention manages the temperature of one or more exhaust gas oxygen sensors using an associated or integrated sensor heater alone or in combination with selective activation or deactivation of one or more cylinders.

While the best mode for carrying out the invention has been described in detail, those familiar with the art to which this invention relates will recognize various alternative designs and embodiments for practicing the invention as defined by the following claims.

What is claimed is:

1. A method for controlling an internal combustion engine having a plurality of cylinders, at least some of which are selectively deactivated in a variable displacement operating mode, and at least one exhaust gas oxygen sensor for providing an indication of oxygen content of an exhaust, the method comprising:
   monitoring temperature of the at least one exhaust gas oxygen sensor; and
   if activation of a heater associated with the at least one sensor is insufficient to achieve or maintain temperature of the exhaust gas oxygen sensor, controlling activation of said heater associated with the at least one sensor and activation of at least one cylinder to achieve or maintain a minimum desired sensor operating temperature.

2. The method of claim 1 wherein the step of monitoring temperature comprises estimating the temperature.

3. The method of claim 1 wherein the step of monitoring temperature comprises sensing the temperature.

4. The method of claim 1 wherein the step of monitoring temperature comprises determining whether the sensor signal can be used for closed-loop air/fuel ratio control.

5. A method for controlling an internal combustion engine having a plurality of cylinders, at least some of which are selectively deactivated in a variable displacement operating mode, and at least one exhaust gas oxygen sensor for providing an indication of oxygen content of an exhaust, the method comprising:
   monitoring temperature of the at least one exhaust gas oxygen sensor; and
   controlling activation of a heater associated with the at least one sensor and activation of at least one cylinder to achieve or maintain a minimum desired sensor operating temperature, wherein the step of controlling activation of at least one cylinder comprises activating a bank of deactivated cylinders to increase the temperature of the exhaust gas oxygen sensor.

6. A method for controlling an internal combustion engine having a plurality of cylinders, at least some of which are selectively deactivated in a variable displacement operating mode, and at lease one exhaust gas oxygen sensor for providing an indication of oxygen content of an exhaust, the method comprising:
   monitoring temperature of the at least one exhaust gas oxygen sensor; and
   controlling activation of a heater associated with the at least one sensor and activation of at least one cylinder to achieve or maintain a minimum desired sensor operating temperature, wherein the step of controlling activation of at least one cylinder comprises activating a bank of deactivated cylinders to increase the temperature of the exhaust gas oxygen sensor, wherein the step of controlling comprises:
   activating the deactivated cylinders and controlling air/fuel ratio to the cylinders during activation to provide a lean air/fuel ratio; and
   controlling air/fuel ratio for a corresponding number of activated cylinders during activation of the deactivated cylinders to provide a rich air/fuel ratio.

7. The method of claim 6 further comprising retarding ignition timing for the deactivated cylinders during activation.

8. A method for controlling an internal combustion engine having a plurality of cylinders, at least some of which are selectively deactivated in a variable displacement operating mode, and at least one exhaust gas oxygen sensor for providing an indication of oxygen content of an exhaust, the method comprising:
   monitoring temperature of the at least one exhaust gas oxygen sensor;
   activating a heater associated with said at least one exhaust oxygen sensor, without activating at least one cylinder, if said heater can maintain said monitored temperature at a desired sensor operating temperature, and
   activating said heater and at least one cylinder if heater activation is insufficient to maintain said monitored temperature at said minimum desired sensor operating temperature.

9. A system for controlling an internal combustion engine having a plurality of cylinders, at least some of which are selectively deactivated in a variable displacement operating mode, the system comprising:
   first and second upstream emission control devices;
   first and second exhaust gas oxygen sensors having associated heaters and positioned upstream relative to the first and second upstream emission control devices, respectively;
   at least a third emission control device positioned downstream relative to at least one of the first and second upstream emission control devices; and
   an engine controller for monitoring temperature of at least one of the exhaust gas oxygen sensors and depending on said temperature monitoring, controlling at least one of
      (a) current supplied to said heater, without activation of at least one cylinder, to achieve or maintain a minimum desired sensor operating temperature, and
      (b) current supplied to said heater and activation of at least one cylinder to achieve or maintain a minimum desired sensor operating temperature.

10. The system of claim 9 wherein the controller modifies spark timing and air/fuel ratio during activation of at least one deactivated cylinder to retard spark timing from MBT timing and provide a lean air/fuel ratio relative to a stoichiometric ratio.

11. The system of claim 9 wherein the exhaust gas oxygen sensors comprise heated exhaust gas oxygen sensors with integrated heaters.

12. A system for controlling an internal combustion engine having a plurality of cylinders, at least some of which are selectively deactivated in a variable displacement operating mode, the system comprising:
   first and second upstream emission control devices;
   first and second exhaust gas oxygen sensors having associated heaters and positioned upstream relative to the first and second upstream emission control devices, respectively;
   at least a third emission control device positioned downstream relative to at least one of the first and second upstream emission control devices; and
   an engine controller for monitoring temperature of at least one of the exhaust gas oxygen sensors and selectively controlling current supplied to the associated heater and operation in the variable displacement operating mode to achieve or maintain a desired minimum sensor operating temperature, wherein the engine controller monitors temperature using a temperature model.

13. Apparatus for controlling a variable displacement internal combustion engine having a plurality of cylinders, at least some of which are selectively deactivated in a variable displacement operating mode, the apparatus comprising:
   at least one exhaust gas oxygen sensor for providing an indication of oxygen content of an exhaust, the at least one exhaust gas oxygen sensor having an associated heater selectively operable to achieve or maintain a minimum desired operating temperature;
   means for monitoring temperature of the at least one exhaust gas oxygen sensor;
   means for controlling activation of the at least one heater associated with the at least one exhaust gas oxygen sensor without changing the variable displacement operating mode, to achieve or maintain a minimum desired sensor operating temperature; and
   means for controlling activation of the at least one heater and the variable displacement operating mode to activate or deactivate at least one cylinder to achieve or maintain a minimum desired sensor operating temperature.

14. The apparatus method of claim 13 wherein the means for monitoring temperature comprises means for estimating the temperature.

15. The apparatus of claim 13 wherein the means for monitoring temperature comprises means for sensing the temperature.

16. The apparatus of claim 13 wherein the means for monitoring temperature comprises means for determining whether the sensor signal can be used for closed-loop air/fuel ratio control.

17. Apparatus for controlling a variable displacement internal combustion engine having a plurality of cylinders, at least some of which are selectively deactivated in a variable displacement operating mode, that apparatus comprising:
   at least one exhaust gas oxygen sensor for providing an indication of oxygen content of an exhaust, the at least one exhaust gas oxygen sensor having an associated heater selectively operable to achieve or maintain a minimum desired operating temperature;
   means for monitoring temperature of the at least one exhaust gas oxygen sensor;
   means for controlling activation of the at least one heater associated with the at least one exhaust gas oxygen sensor;
   means for controlling the variable displacement operating mode to activate or deactivate at least one cylinder to achieve or maintain a minimum desired sensor operating temperature; wherein the means for controlling the variable displacement operating mode comprises means for activating a bank of deactivated cylinders to increase the temperature of the exhaust gas oxygen sensor.

18. An apparatus for controlling a variable displacement internal combustion engine having a plurality of cylinders, at least some of which are selectively deactivated in a variable displacement operating mode, the apparatus comprising:
   at least one exhaust gas oxygen sensor for providing an indication of oxygen content of an exhaust, the at least one exhaust gas oxygen sensor having an associated heater selectively operable to achieve or maintain a minimum desired operating temperature;
   means for monitoring temperature of the at least one exhaust gas oxygen sensor;

means for controlling activation of the at least one heater associated with the at least one exhaust gas oxygen sensor; and means for controlling the variable displacement operating mode to activate or deactivate at least one cylinder to achieve or maintain a minimum desired sensor operating temperature, wherein the means for controlling the variable displacement operating mode comprises means for activating a bank of deactivated cylinders to increase the temperature of the exhaust gas oxygen sensor, wherein the means for controlling the variable displacement operating mode comprises:

means for activating the deactivated cylinders and controlling air/fuel ratio to the cylinders during activation to provide a lean air/fuel ratio; and means for controlling air/fuel ratio for a corresponding number of activated cylinders during activation of the deactivated cylinders to provide a rich air/fuel ratio.

19. The apparatus of claim 18 further comprising means for retarding ignition timing for the deactivated cylinders during activation.

* * * * *